(12) United States Patent
Elnozahy et al.

(10) Patent No.: US 7,499,966 B2
(45) Date of Patent: Mar. 3, 2009

(54) WEB SERVER ARCHITECTURE FOR IMPROVED PERFORMANCE

(75) Inventors: Elmootazbellah Nabil Elnozahy, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1608 days.

(21) Appl. No.: 09/935,414

(22) Filed: Aug. 23, 2001

(65) Prior Publication Data

US 2003/0041118 A1    Feb. 27, 2003

(51) Int. Cl.
*G06F 15/13* (2006.01)
(52) U.S. Cl. .............. 709/203; 709/218; 709/220; 709/228; 719/327
(58) Field of Classification Search ............. 709/203, 709/218, 220, 228; 719/327
See application file for complete search history.

(56) References Cited

U.S. PATENT DOCUMENTS

| | | | |
|---|---|---|---|
| 6,163,812 A * | 12/2000 | Gopal et al. ............... 719/310 |
| 6,272,522 B1 * | 8/2001 | Lin et al. .................. 709/200 |
| 6,668,279 B1 * | 12/2003 | Curtis ....................... 709/218 |
| 6,779,035 B1 * | 8/2004 | Gbadegesin ............... 709/228 |
| 2001/0044904 A1 * | 11/2001 | Berg et al. ................. 713/201 |
| 2003/0023767 A1 * | 1/2003 | Brabson et al. |
| 2003/0131263 A1 * | 7/2003 | Keane et al. |
| 2004/0044760 A1 * | 3/2004 | Deily et al. |

* cited by examiner

*Primary Examiner*—Jinsong Hu
(74) *Attorney, Agent, or Firm*—Casimer K. Salys; Dillon & Yudell LLP

(57) ABSTRACT

A web server that integrates portions of operating system code to execute substantially within user space to reduce context switching. The web server includes an application level interpreter, such as an HTTP interpreter, configured to process client requests. The web server typically includes a network interface dedicated to process traffic to and from the web server. The web server may include within its user space kernel device driver extensions enabling it to communicate directly with the network interface. The server may implement a polling architecture in which the server periodically monitors the interface for new requests. The web server typically includes a user space transmission protocol library that enables the server to perform its own network processing of requests and responses. The library may include TCP/IP drivers that are optimized or streamlined for to processing HTTP requests.

11 Claims, 4 Drawing Sheets

WEB SERVER ARCHITECTURE FOR IMPROVED PERFORMANCE

BACKGROUND

1. Field of the Present Invention

The present invention generally relates to the field of web-based applications and more particularly to a web server architecture that incorporates and optimizes elements typically implemented in kernel space to reduce context switching and produce a more efficient server.

2. History of Related Art

The Internet has become a medium for business and other applications, resulting in a commensurate proliferation of web-based services. Typically, web-based services are implemented by installing specialized software, referred to herein as a web server, on a server device that is connected to a network, whether it is a wide area network (WAN) such as the Internet or a local area network (LAN). A web server is accessed over the network from various client devices running client applications such as conventional web browsers that issue requests to web servers. A common example is a Hypertext Transfer Protocol (HTTP) formatted client request to retrieve and display a particular web page. The amount of time that expires between the time a client request is received by a server device and the time the server device sends an appropriate response back to the client reflects the performance of the web server.

Referring to FIG. 1, selected features of conventional web server architecture are depicted in block diagram format. In the depicted embodiment, a server device 100 includes various software components that work in conjunction with the actual web server application to handle client requests. A network interface 102 interacts with the network at the hardware level to receive client requests from the network. Upon receiving a client request, network interface 102 issues an interrupt to the operating system kernel 104. The kernel 104 must then suspend its current processing and invoke one or more network protocol routines indicated in FIG. 1 by the Transmission Control Protocol/Internet Protocol (TCP/IP) block 106. TCP/IP is a widely implemented suite of protocols that support networked computing on a large number of computer networks including the Internet. Among other functions, TCP/IP 106 extracts an HTTP formatted request from one or more received network packets. TCP/IP 106 then hands the extracted HTTP request to a web server application indicated by reference numeral 110.

To process an HTTP request, web server 110 is typically required to retrieve data by accessing a file system cache 122 via a file system 120. If the requested data is not present in file system cache 122, file system 120 may retrieve the data from disk. File system 120 then provides the retrieved data to web server 110. Web server 110 then accesses TCP/IP 106 to prepare the retrieved data for transmission over the network. This TCP/IP formatted response is then sent to the requesting client over the network via network interface 102.

Those knowledgeable in client-server software and server class operating systems will appreciate that the interrupt driven process described above suffers from excessive context switching that will undesirably limit server performance. Context switching refers generally to a change in state that occurs when a server processor switches from executing one process to another. Context switching is especially time consuming when an application program operating in user space invokes a process that executes in the kernel space, or vice versa. The user space and kernel space identify conceptual spaces defined by the operating system that have different levels of protection. Operating systems typically implement protection mechanisms to restrict access to the operating system's trusted core code. Because the bulk of the network communication code exists in kernel space, web server 110 must invoke kernel code frequently. Moreover, the generic or fully general TCP/IP code that resides in the kernel space is not optimized for web server processing. The generic code, for example, includes socket layer processing for general-purpose packet assembly and disassembly, but incurs some processing overhead. Because of the web server's wide spread prevalence in Internet applications, it would be highly desirable to implement a server that relied less heavily on operating system protected code and was optimized for processing specific types of network packets.

SUMMARY OF THE INVENTION

The problems identified above are in large part addressed by implementing a stand-alone web server that integrates portions of operating system code to execute substantially within user space thereby significantly reducing the context switching overhead characteristic of conventional web server execution. The web server includes an application level interpreter, such as an HTTP interpreter, configured to process client requests. The web server also acquires from the operating system exclusive access to a network interface dedicated exclusively for the purpose of processing traffic to and from the web server. The web server may include within its user space kernel device driver extensions that enable it to communicate with the interface directly. In this embodiment, the server may replace conventional interrupt driven processing with a polling architecture in which the server periodically monitors the interface for new requests. The polling architecture and device access occurs through sharing memory between the web server and the network interface device. The web server includes a user space transmission protocol library that enables the server to perform its own network processing of requests and responses. The library may include TCP/IP drivers that are optimized or streamlined for processing HTTP requests. The server may include the ability to spawn multiple user space threads including, perl scripts, cgi threads, and Java servlets. No heavy-weight processes are spawned during normal operation.

BRIEF DESCRIPTION OF THE DRAWINGS

Other objects and advantages of the invention will become apparent upon reading the following detailed description and upon reference to the accompanying drawings in which.

Figure 1:
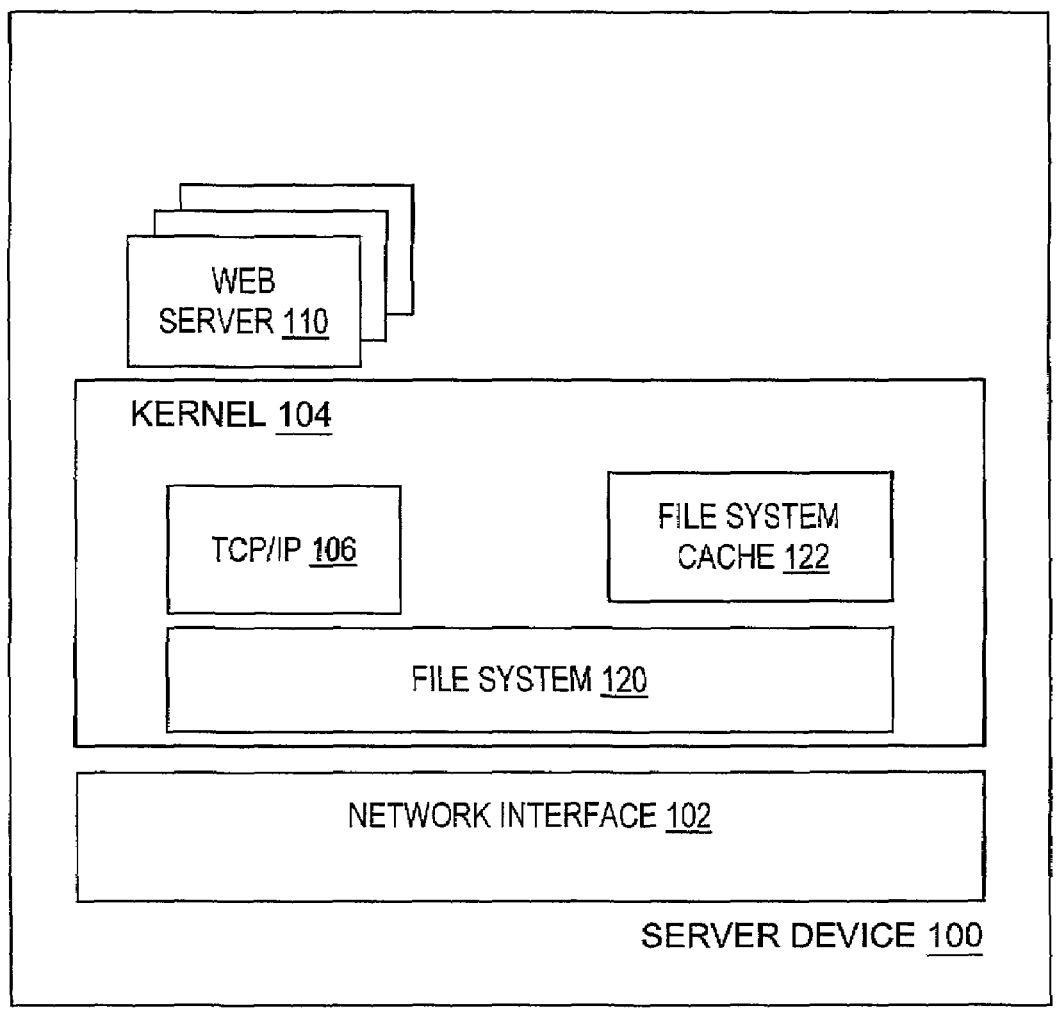
FIG. 1 is a conceptualized block diagram of selected features of a web server software architecture according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a web server application that operates substantially without dependence on operating system kernel code. Kernel extension device drivers are incorporated into the web server along with an optimized TCP/IP stack to free the web server from dependence on the kernel. Polling may used to query a dedicated network interface thereby eliminating interrupt processing overhead. By implementing a stand-alone web server, the context switching and protocol overhead characteristic of conventionally implemented web servers is reduced and performance thereby improved.

Portions of the present invention may be implemented as a set of computer executable instructions (software) stored on a computer readable medium including volatile mediums such as DRAM or SRAM as well as permanent or non-volatile mediums such as a floppy diskette, hard disk, flash memory card, ROM device, CD ROM, DVD, magnetic tape or other suitable medium.

Figure 2:
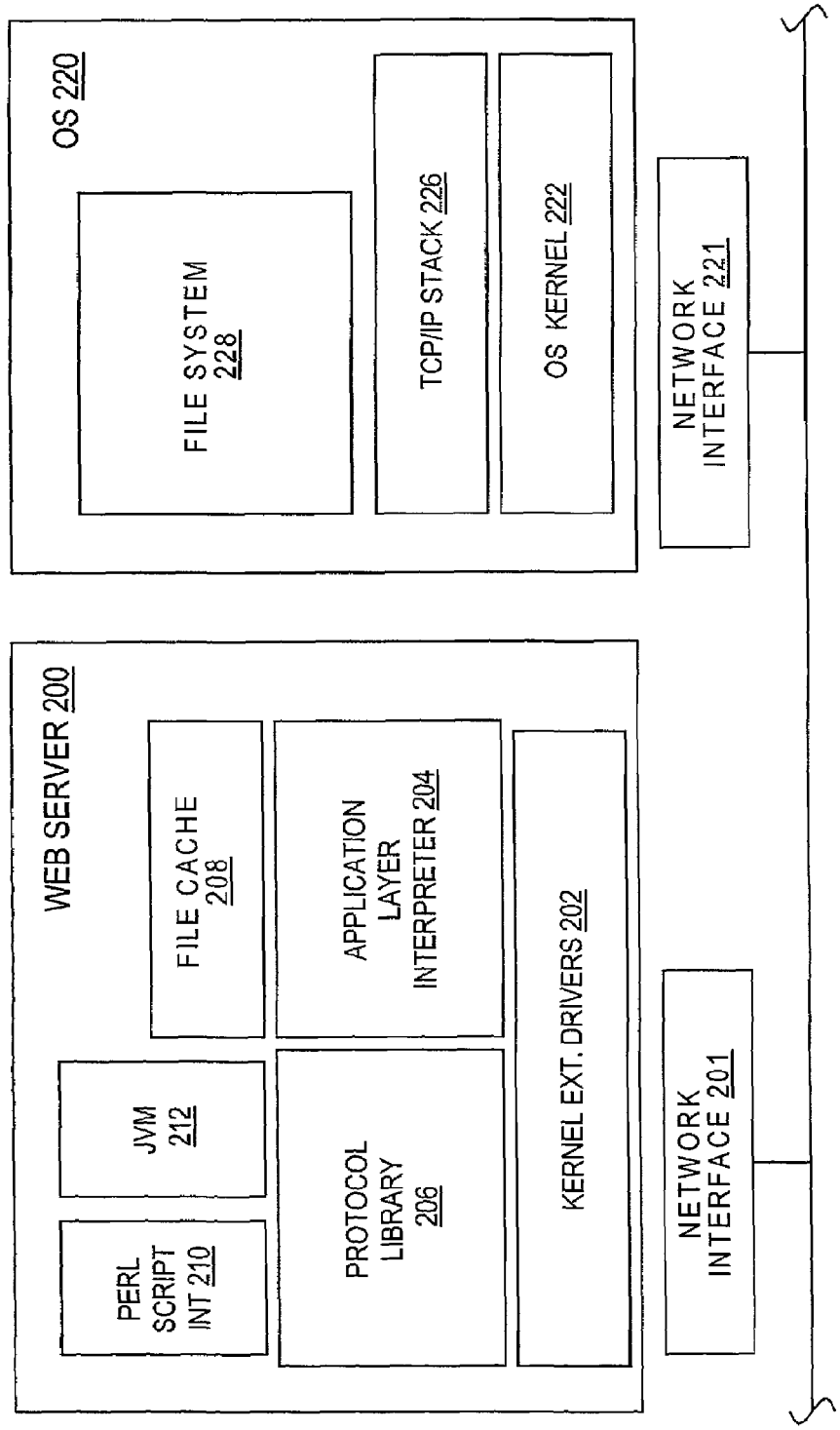
FIG. 2 is a conceptualized block diagram of selected features of a web server software architecture according to one embodiment of the present invention.

Referring now to FIG. 2, a block diagram of selected architectural features of a web server according to one embodiment of the invention is depicted. In the depicted embodiment, web server 200 communicates with a hardware component identified as a web server network interface 201. In one embodiment, network interface 201 is dedicated to handle network packets addressed to or generated by web server 200. If the server device on which web server 200 resides is configured to execute other applications or perform other network functions, a general purpose interface 221 distinct from interface 201 is included to handle them.

Web server 200 is scheduled by the kernel and is given a high priority compared to other processes. Web server 200 is a multithreaded application in which threads are created, scheduled, and manipulated entirely within the application's user space. Web server 200 includes an interpreter 204 that acts at the application level of the network protocol to process client requests. In a widely applicable embodiment, interpreter 204 comprises or includes an HTTP interpreter enabled to service HTTP formatted requests. Web server 200 may be dedicated exclusively for the purpose of handling of HTTP requests in applications where HTTP requests comprise a significant portion of all network traffic processed by the server.

In addition to interpreter 204, Web server 200 may further include a Perl script interpreter 210, and a built-in Java Virtual Machine (JVM) 212. Pern script interpreter 210 allows a thread within the Web server to execute cgi-bin requests that require the execution of a script. Similarly, JVM 212 allows a thread within Web server 200 to run Java servlets according to client requests. Both script interpreter 210 and JVM 212 reside in the same address space as Web server 200, thereby obviating the need for context switching or spawning heavyweight processes external to Web server 200, as is commonly done in the art. Those skilled in the art may appreciate that additional engines could be added inside Web server 200, and that the two examples provided are not intended to be limiting.

Web server 200 includes drivers referred to herein as kernel extension device drivers 202 that enable interpreter 204 to communicate directly with network interface 201. Kernel extension device drivers 202 are user space extensions of operating system code. Incorporating kernel routines that are frequently invoked by the web server into the web server user space enables web server 200 to execute with fewer kernel calls. Fewer kernel calls produces improved performance by reducing the extensive context switching that typically occurs when a user space application program invokes protected code. To further facilitate direct communication between web server 200 and network interface 201, the network interface memory is preferably mapped into the address space of web server 200. In this manner, web server 200 is configured to access (i.e., read and write) the network interface buffers directly. This memory sharing enables the web server to receive network packets and network status directly by polling the network interface and to eliminate the processing of interrupts through the kernel. Additionally, this memory sharing allows web server 200 to process the packets directly in the memory locations where they were deposited by the networking interface, obviating the need for data copying as is done in conventional approaches where the web server is separated from the kernel and memory copying occurs between the kernel memory and the web server memory. Similarly, the network interface has access to the outgoing packets directly from the web server's memory without performing any memory copying.

In one embodiment, kernel extension device drivers 202 are configured to poll network interface 201 periodically to determine when new client requests have arrived. The polling mechanism eliminates the need for network interface 201 to issue interrupts each time a client request is received. Eliminating or reducing the potentially significant interrupt processing that occurs each time a conventionally implemented network interface receives a packet further improves the performance of web server 200.

The depicted embodiment of web server 200 further includes an integrated, network protocol library 206 that enables web server 200 to perform its own network processing without invoking protected code. In one embodiment particularly suitable for applications that use the Internet, protocol library 206 includes TCP/IP library routines that provide a user space TCP/IP protocol stack to web server 200. Protocol library 206 may be implemented as a fully general TCP/IP library capable of handling all of protocol supported events and tasks. Such an embodiment would include, for example, socket management code needed to perform TCP/IP routing functions. This code may be relatively complex and time consuming and may provide little if any benefit to the web server according to the current embodiment. Eliminating socket processing further improves performance and reduces complexity.

Figure 3:
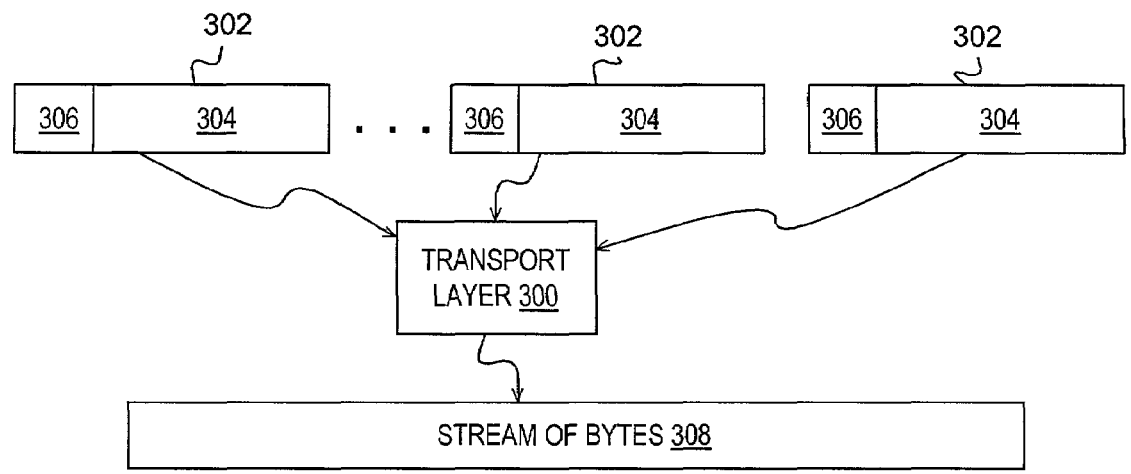
FIG. 3 is a representation of transport layer processing that may occur in a network protocol stack.

Referring to FIG. 3, for example, an example of the processing that may occur in the transport layer of a fully general protocol stack is illustrated. In the illustrated example, a client request travels the network as a set of fragments 302, several of which are depicted. Each fragment 302 may include a header portion 306 and a data portion 304. The transport layer code, represented in FIG. 3 by reference numeral 300, is responsible for tracking or determining which fragments belong to a particular "conversation" and for assembling the packets of a particular conversation into a single stream of bytes 308 suitable for presenting to a higher level of the protocol stack for further processing.

While the code needed to perform this processing is necessary in a generalized application, the present invention contemplates the elimination of such code in the user space protocol library 206 to optimize server performance. In this embodiment, web server 200 as depicted in FIG. 2, may include the code necessary to assemble and fragment portions of an HTTP formatted conversation between server and client. In this embodiment, it is possible to provision library 206 with a limited subset of protocol routines without adversely affecting server operation while potentially improving performance.

Integrating user space extensions of the operating system kernel code and protocol stack into the web server enables web server 200 to operate substantially independently of the operating system. As seen in FIG. 2, the operating system space 220 (also referred to as simply operating system 220), which includes a kernel 222 and a protocol stack 226 interfaces with the general purpose network interface 221. General purpose network interface 221 and dedicated web server interface 201 are both connected to a network medium such as an Ethernet cable or other suitable hardware. With the architecture depicted in FIG. 2, in which web server 200 includes its own user space file cache 208, server 200 will rely on operating system 220 extensively only for retrieving data that is not currently cached in file cache 208. When non-cached data is accessed, web server 200 will invoke the operating system file system 228 to retrieve the data from disk or other non-volatile storage facility.

In one embodiment, web server 200 is configured to execute multiple threads internally (i.e., within the web server user space 200). These threads may include any of a variety of threads typically encountered during web server processing including http server threads, cgi-bin threads, perl scripts, java servlets etc. The ability to execute in-server threads is preferred to the conventional web server architecture in which each script generates a process that executes externally to the web server user space.

Figure 4:
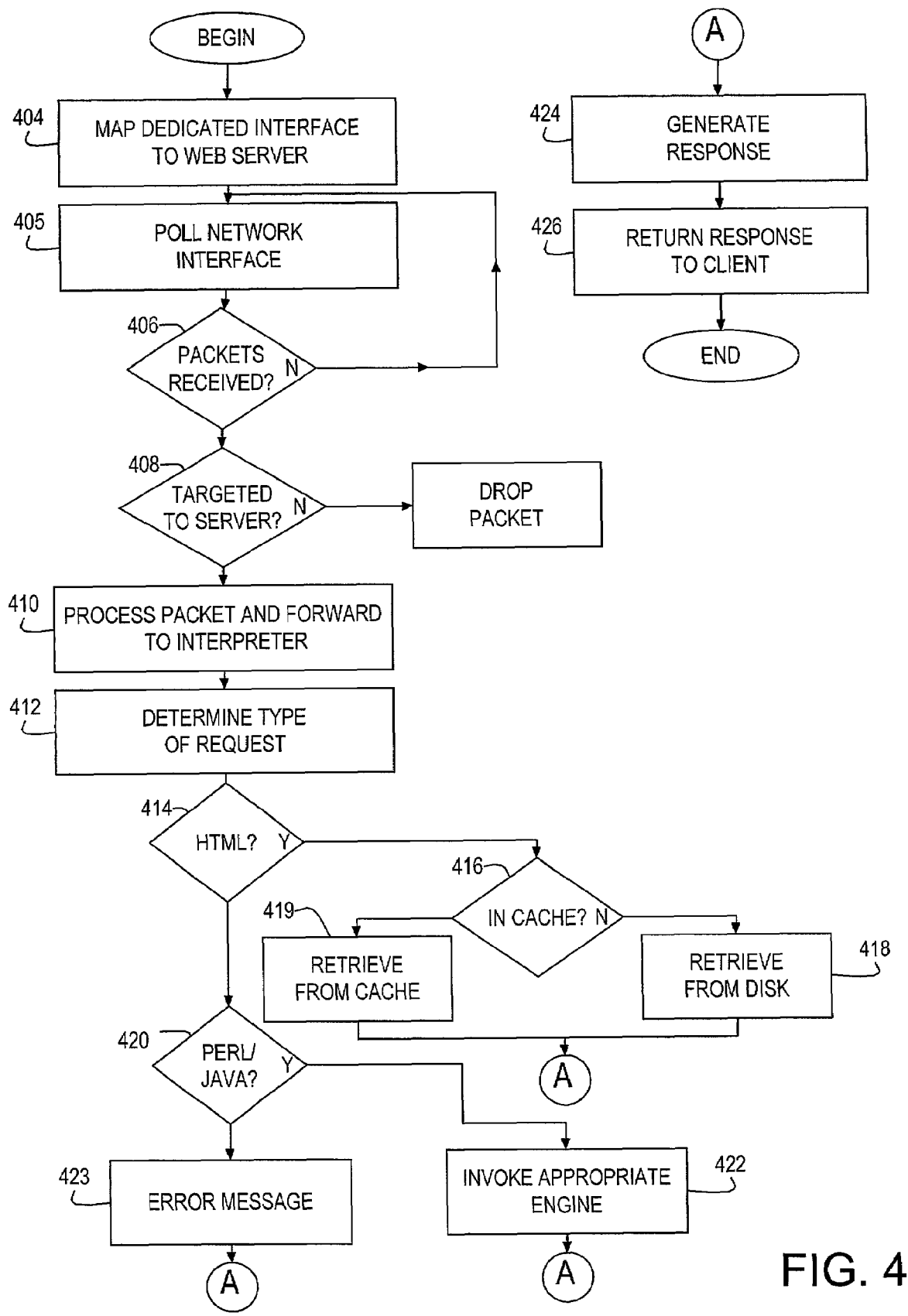
FIG. 4 is a flow diagram illustrating operation of the web server of FIG. 2.

Turning now to FIG. 4, a flow diagram illustrating the operation of a data processing system that includes a web server 200 according to the present invention is depicted. In describing the flow diagram, references to the components of web server 200 depicted in FIG. 2 are indicated without the corresponding reference numerals. Initially, the operating system kernel starts the multithreaded Web server described above. The web server is assigned a high priority by the operating system kernel. The kernel then maps (block 404) the dedicated network interface to the web server. The mapping of the dedicated interface to the web server preferably includes the kernel creating a shared buffer between the server's memory address space and the network device interface buffers.

After the dedicated network interface has been mapped to the web server, the server is configured to periodically poll (block 405) the network interface to determine if the interface has received any network packets. If the polling determines that a network packet has been received, network processing of the packet is performed (block 406) by the server's user space TCP/IP protocol library. If the network processing determines (block 408) that the packet is not targeted for the web server, the packet is simply dropped by the web server. If the packet has been correctly received, the protocol library processes (block 410) the lower layers of the packet and forwards the packet to the application layer interpreter. The application layer interpreter then processes (block 412) the application layer header (e.g., the HTTP header) to determine the type of request that has been received.

In the case where the interpreter is an HTTP interpreter, for example, the request may comprise a request for an HTML file, a request to execute a Perl script, or a request to run a Java® servlet, among other possible requests. If the application layer interpreter determines (block 414) that the request is for a file such as an HTML file, the interpreter then determines (block 416) whether the requested file is currently within the server's file cache. Depending upon whether the requested file is in the file cache, the document is retrieved from disk (block 418) using the operating system's file system or from the cache (block 419). If the request is determined in block 420 to be a request to execute a Perl script or a Java® servlet, the interpreter may invoke (block 422) the Perl script interpreter or JVM respectively and forward the request to the invoked process. If the request is not recognized as a request for an HTML or a request to execute a script recognized by the server, an error message (e.g., an HTTP ERROR CODE 404-NOT FOUND) is generated in block 423.

Regardless of the type of request, the web server generates (block 424) an appropriate response by retrieving data (from cache or disk) and/or performing any required network processing. The response is then returned (block 426) to the requesting client via the dedicated network interface. After processing the request, the server returns to a polling mode in which it monitors the network interface for subsequent requests. In this manner, the web server and its dedicated network interface handle application requests such as HTTP requests in a highly efficient manner. It will be apparent to those skilled in the art having the benefit of this disclosure that the present invention contemplates a web server optimized for processing specific types of requests and implemented for stand-alone operation that reduces operating system overhead. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer system including an operating system, a first network interface, and a second network interface, said operating system including a kernel and a protocol stack interfacing with said first network interface, and a file system, also executing a web server having a user space comprising:
   an application layer interpreter, said application layer interpreter being configured to process a client request;
   at least one kernel extension device driver, said kernel extension device driver enabling the application layer interpreter to communicate with said second network interface to receive the client request; and
   a transmission protocol library, said transmission protocol library including protocol stacks including TCP/IP library routines, enabling the web server to process the client request and corresponding response.

2. The server of claim 1, wherein the interpreter comprises an HTTP interpreter.

3. The server of claim 1, wherein the library includes only those routines necessary for processing of requests to and responses from the application layer interpreter.

4. The server of claim 1, wherein the web server includes a file cache, said file cache enabling said web server to service said client request without invoking said operating system file system.

5. The server of claim 1, wherein the web server is configured to initiate multiple threads responsive to user requests.

6. The server of claim 5, wherein the threads include threads selected from the group of threads including perl scripts, cgi threads, and Java servlets.

7. A computer system comprising:
   processor, memory, and input means;
   an operating system, said operating system including a kernel, a protocol stack, and a file system;
   a web server;

a dedicated network interface in communication with said web server and a general purpose network interface in communication with said operating system;

an application level interpreter in said web server, said application level interpreter being configured to process a client request;

kernel extension device drivers in said web server, said kernel extension device drivers enabling the application level interpreter to communicate with the dedicated network interface to receive the client request; and a a protocol library in said web server, said protocol library including a TCP/IP protocol stack separate from the operating system protocol stack, said protocol library TCP/IP protocol stack enabling the web server to perform network processing of the client request and a corresponding response within the user space.

8. The server of claim 7, wherein the interpreter comprises an HTTP interpreter.

9. The server of claim 7, wherein the web server includes a file cache, said file cache enabling said web server to service said client request without invoking said operating system space file system.

10. The server of claim 7, wherein the web server is configured to initiate multiple threads responsive to user requests.

11. The server of claim 10, wherein the threads include threads selected from the group of threads including perl scripts, cgi threads, and Java servlets.

* * * * *